US011146112B1

United States Patent
Luo

(10) Patent No.: US 11,146,112 B1
(45) Date of Patent: Oct. 12, 2021

(54) TRANSIENT PROTECTION APPARATUS AND METHOD FOR WIRELESS POWER TRANSFER SYSTEM

(71) Applicant: NuVolta Technologies (Hefei) Co., Ltd., Hefei (CN)

(72) Inventor: Zhijun Luo, Shanghai (CN)

(73) Assignee: NuVolta Technologies (Hefei) Co., Ltd., Hefei (CN)

( * ) Notice: Subject to any disclaimer, the term of this patent is extended or adjusted under 35 U.S.C. 154(b) by 0 days.

(21) Appl. No.: 16/922,222

(22) Filed: Jul. 7, 2020

(30) Foreign Application Priority Data

Jun. 28, 2020 (CN) .......................... 202010597964.4

(51) Int. Cl.
*H02J 50/12* (2016.01)
*H02M 7/5387* (2007.01)
*H02M 1/08* (2006.01)
*H02M 1/32* (2007.01)
*H02M 1/00* (2006.01)

(52) U.S. Cl.
CPC .............. *H02J 50/12* (2016.02); *H02M 1/08* (2013.01); *H02M 1/32* (2013.01); *H02M 7/5387* (2013.01); *H02M 1/0009* (2021.05)

(58) Field of Classification Search
CPC ........ B60L 11/00; B60L 11/182; H01F 38/00; H01F 38/14; H02J 17/00; H02J 5/00; H02J 5/005; H02J 50/00; H02J 50/12; H02J 7/00; H02J 7/025; H02M 1/00; H02M 1/08; H02M 1/32; H02M 2001/00; H02M 2001/0009; H02M 7/00; H02M 7/5387
USPC ....................................................... 307/104
See application file for complete search history.

(56) References Cited

U.S. PATENT DOCUMENTS

| 9,608,454 | B2 | 3/2017 | Sankar |
| 2015/0372493 | A1* | 12/2015 | Sankar ................ H02J 7/00308 307/104 |
| 2019/0280527 | A1 | 9/2019 | Smith et al. |

* cited by examiner

*Primary Examiner* — Lincoln D Donovan
*Assistant Examiner* — Dave Mattison
(74) *Attorney, Agent, or Firm* — Slater Matsil, LLP

(57) ABSTRACT

A method includes in a switching cycle of a power converter in a wireless power transfer system, finding a time instant corresponding to one fourth of the switching cycle, wherein the power converter is coupled between an input power source and a transmitter coil magnetically coupled to a receiver coil, at the time instant, detecting a current flowing through the transmitter coil, wherein power transferred between the transmitter coil and the receiver coil is proportional to the current flowing through the transmitter coil, comparing the current flowing through the transmitter coil with a plurality of predetermined thresholds to determine whether a transient occurs, and applying a control mechanism to the power converter in response to an occurrence of the transient.

20 Claims, 8 Drawing Sheets

TRANSIENT PROTECTION APPARATUS AND METHOD FOR WIRELESS POWER TRANSFER SYSTEM

PRIORITY CLAIM

This application claims priority to Chinese Patent Application No. 202010597964.4, filed on Jun. 28, 2020, which is hereby incorporated by reference in its entirety.

TECHNICAL FIELD

The present invention relates to a transient protection apparatus, and, in particular embodiments, to a transient protection apparatus for a wireless power transfer system.

BACKGROUND

As technologies further advance, wireless power transfer has emerged as an efficient and convenient mechanism for powering or charging battery based mobile devices such as mobile phones, tablet PCs, digital cameras, MP3 players and/or the like. A wireless power transfer system typically comprises a primary side transmitter and a secondary side receiver. The primary side transmitter is magnetically coupled to the secondary side receiver through a magnetic coupling. The magnetic coupling may be implemented as a loosely coupled transformer having a primary side coil formed in the primary side transmitter and a secondary side coil formed in the secondary side receiver.

The primary side transmitter may comprise a power conversion unit such as a primary side of a power converter. The power conversion unit is coupled to a power source and is capable of converting electrical power to wireless power signals. The secondary side receiver is able to receive the wireless power signals through the loosely coupled transformer and convert the received wireless power signals to electrical power suitable for a load.

As power consumption has become more important, there may be a need for wireless power transfer systems having faster transient response. More particularly, a wireless power transfer system may operate in various operation conditions. For example, the wireless power transfer system may have a coupling transient in which the magnetic coupling between the receiver and the transmitter changes from a loose coupling to a tight coupling. As a result of this coupling change, the output voltage of the receiver may rise significantly. Furthermore, the wireless power transfer system may have a load transient in which the load of the receiver goes from a heavy load state to a light load state. As a result of this load change, the output voltage of the receiver may rise significantly.

The feedback control of a conventional wireless power transfer system is not fast enough to regulate the output voltage under various transients. In actual applications, a plurality of over-voltage protection devices such as sink resistors, clamping capacitors and the like may be employed to limit the output voltage within a predetermined range. However, as the power of the wireless power transfer system goes higher, the transient response becomes a significant issue, which presents challenges to the system design of the wireless power transfer system.

It would be desirable to have a simple and reliable control mechanism to provide a fast transient response under a variety of operating conditions.

SUMMARY

These and other problems are generally solved or circumvented, and technical advantages are generally achieved, by preferred embodiments of the present disclosure which provide a transient protection apparatus and method for a wireless power transfer system.

In accordance with an embodiment, an apparatus comprises a transmitter coil configured to be magnetically couple to a receiver coil, a power conversion device coupled to the transmitter coil, and a controller configured to control a operating variable of the power conversion device in response to a operating condition change, wherein the controller comprises a one-fourth cycle detection block configured to set up a current sensing time instant, and wherein at the current sensing time instant, a current flowing through the transmitter coil is detected and compared with a plurality of predetermined thresholds to determine which type of transient occurs.

In accordance with another embodiment, a method comprises in a switching cycle of a power converter in a wireless power transfer system, finding a time instant corresponding to one fourth of the switching cycle, at the time instant, detecting a current flowing through a transmitter coil of the wireless power transfer system, comparing the current flowing through the transmitter coil with a plurality of predetermined thresholds, and applying a control mechanism to the power converter based on comparing results of the step of comparing the current flowing through the transmitter coil with a plurality of predetermined thresholds.

In accordance with yet another embodiment, a method comprises in a switching cycle of a power converter in a wireless power transfer system, finding a time instant corresponding to one fourth of the switching cycle, wherein the power converter is coupled between an input power source and a transmitter coil magnetically coupled to a receiver coil, at the time instant, detecting a current flowing through the transmitter coil, wherein power transferred between the transmitter coil and the receiver coil is proportional to the current flowing through the transmitter coil, comparing the current flowing through the transmitter coil with a plurality of predetermined thresholds to determine whether a transient occurs, and applying a control mechanism to the power converter in response to an occurrence of the transient.

The foregoing has outlined rather broadly the features and technical advantages of the present disclosure in order that the detailed description of the disclosure that follows may be better understood. Additional features and advantages of the disclosure will be described hereinafter which form the subject of the claims of the disclosure. It should be appreciated by those skilled in the art that the conception and specific embodiment disclosed may be readily utilized as a basis for modifying or designing other structures or processes for carrying out the same purposes of the present disclosure. It should also be realized by those skilled in the art that such equivalent constructions do not depart from the spirit and scope of the disclosure as set forth in the appended claims.

BRIEF DESCRIPTION OF THE DRAWINGS

For a more complete understanding of the present disclosure, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the various embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present disclosure provides many applicable inventive concepts that can be embodied in a wide variety of specific contexts. The specific embodiments discussed are merely illustrative of specific ways to make and use the disclosure, and do not limit the scope of the disclosure.

The present disclosure will be described with respect to preferred embodiments in a specific context, namely a transient protection apparatus for a wireless power transfer system. The invention may also be applied, however, to a variety of power systems. Hereinafter, various embodiments will be explained in detail with reference to the accompanying drawings.

Figure 1:
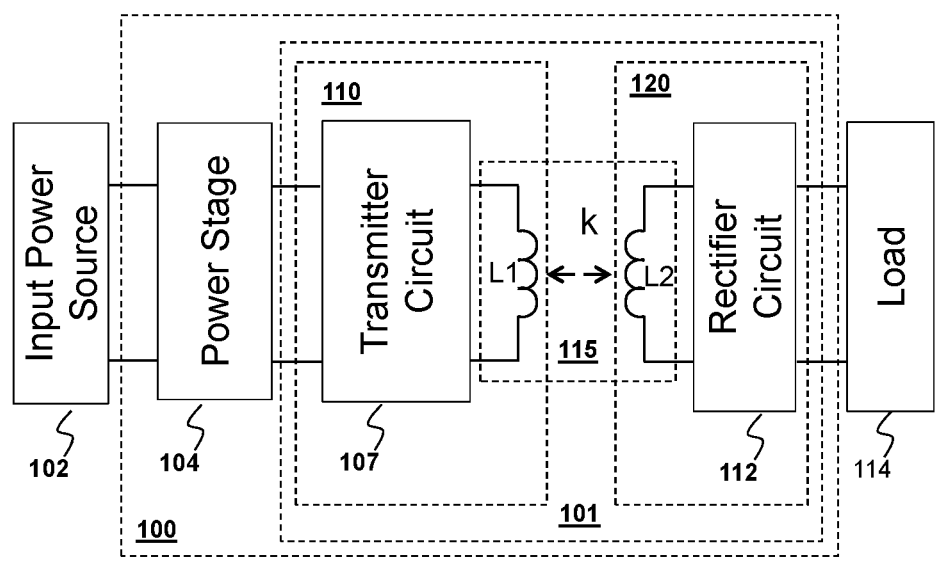
FIG. 1 illustrates a block diagram of a wireless power transfer system in accordance with various embodiments of the present disclosure.

FIG. 1 illustrates a block diagram of a wireless power transfer system in accordance with various embodiments of the present disclosure. The wireless power transfer system 100 comprises a power stage 104 and a wireless power transfer device 101 connected in cascade between an input power source 102 and a load 114. The wireless power transfer device 101 includes a transmitter 110 and a receiver 120. As shown in FIG. 1, the transmitter 110 comprises a transmitter circuit 107 and a transmitter coil L1 connected in cascade. The input of the transmitter circuit 107 is coupled to an output of the power stage 104. The receiver 120 comprises a receiver coil L2 and a rectifier 112 connected in cascade. The output of the rectifier 112 is coupled to the load 114.

The transmitter 110 is magnetically coupled to the receiver 120 through a magnetic field when the receiver 120 is placed near the transmitter 110. A loosely coupled transformer 115 is formed by the transmitter coil L1, which is part of the transmitter 110, and the receiver coil L2, which is part of the receiver 120. As a result, power may be transferred from the transmitter 110 to the receiver 120.

In some embodiments, the transmitter 110 may be inside a charging pad. The transmitter coil is placed underneath the top surface of the charging pad. The receiver 120 may be embedded in a mobile phone. When the mobile phone is place near the charging pad, a magnetic coupling may be established between the transmitter coil and the receiver coil. In other words, the transmitter coil and the receiver coil may form a loosely coupled transformer through which a power transfer occurs between the transmitter 110 and the receiver 120. The strength of coupling between the transmitter coil L1 and the receiver coil L2 is quantified by the coupling coefficient k. In some embodiments, k is in a range from about 0.05 to about 0.9.

In some embodiments, after the magnetic coupling has been established between the transmitter coil L1 and the receiver coil L2, the transmitter 110 and the receiver 120 may form a power system through which power is wirelessly transferred from the input power source 102 to the load 114.

The input power source 102 may be a power adapter converting a utility line voltage to a direct-current (dc) voltage. Alternatively, the input power source 102 may be a renewable power source such as a solar panel array. Furthermore, the input power source 102 may be an energy storage device such as rechargeable batteries, fuel cells and/or the like.

The load 114 represents the power consumed by the mobile device (e.g., a mobile phone) coupled to the receiver 120. Alternatively, the load 114 may refer to a rechargeable battery and/or batteries connected in series/parallel, and coupled to the output of the receiver 120.

The transmitter circuit 107 may comprise primary side switches of a full-bridge power converter according to some embodiments. The full-bridge is also known as an H-bridge. Alternatively, the transmitter circuit 107 may comprise the primary side switches of other converters such as a half-bridge converter, a push-pull converter and the like. The detailed configuration of the transmitter circuit 107 will be described below with respect to FIG. 2.

It should be noted that the converters described above are merely examples. One having ordinary skill in the art will recognize other suitable power converters such as class E topology based power converters (e.g., a class E amplifier), may alternatively be used.

The transmitter circuit 107 may further comprise a resonant capacitor. The resonant capacitor and the magnetic inductance of the transmitter coil may form a resonant tank. Depending on design needs and different applications, the resonant tank may further include a resonant inductor. In some embodiments, the resonant inductor may be implemented as an external inductor. In alternative embodiments, the resonant inductor may be implemented as a connection wire.

The receiver 120 comprises the receiver coil L2 magnetically coupled to the transmitter coil L1 after the receiver 120 is placed near the transmitter 110. As a result, power may be transferred to the receiver coil and further delivered to the load 114 through the rectifier 112. The receiver 120 may comprise a secondary resonant capacitor.

The rectifier 112 converts an alternating polarity waveform received from the output of the receiver coil L2 to a single polarity waveform. In some embodiments, the rectifier 112 is implemented as a synchronous rectifier including four switches. In alternative embodiments, the rectifier 112 comprises a full-wave diode bridge and an output capacitor.

Furthermore, the synchronous rectifier may be formed by any controllable devices such as metal oxide semiconductor field effect transistor (MOSFET) devices, bipolar junction transistor (BJT) devices, super junction transistor (SJT) devices, insulated gate bipolar transistor (IGBT) devices, gallium nitride (GaN) based power devices and/or the like. The detailed structure of the rectifier 112 will be discussed below with respect to FIG. 2.

The power stage 104 is coupled between the input power source 102 and the input of the wireless power transfer device 101. Depending design needs and different applications, the power stage 104 may comprise many different configurations. In some embodiments, the power stage 104 may be a non-isolated power converter such as a buck converter. In some embodiments, the power stage 104 may be implemented as a linear regulator. In some embodiments, the power stage 104 may be an isolated power converter such as a forward converter.

The implementation of the power stage 104 described above is merely an example, which should not unduly limit the scope of the claims. One of ordinary skill in the art would recognize many variations, alternatives, and modifications. Furthermore, depending on different applications and design needs, the power stage 104 may be an optional element of the wireless power transfer system 100. In other words, the input power source 102 may be connected to the transmitter circuit 107 directly.

Figure 2:
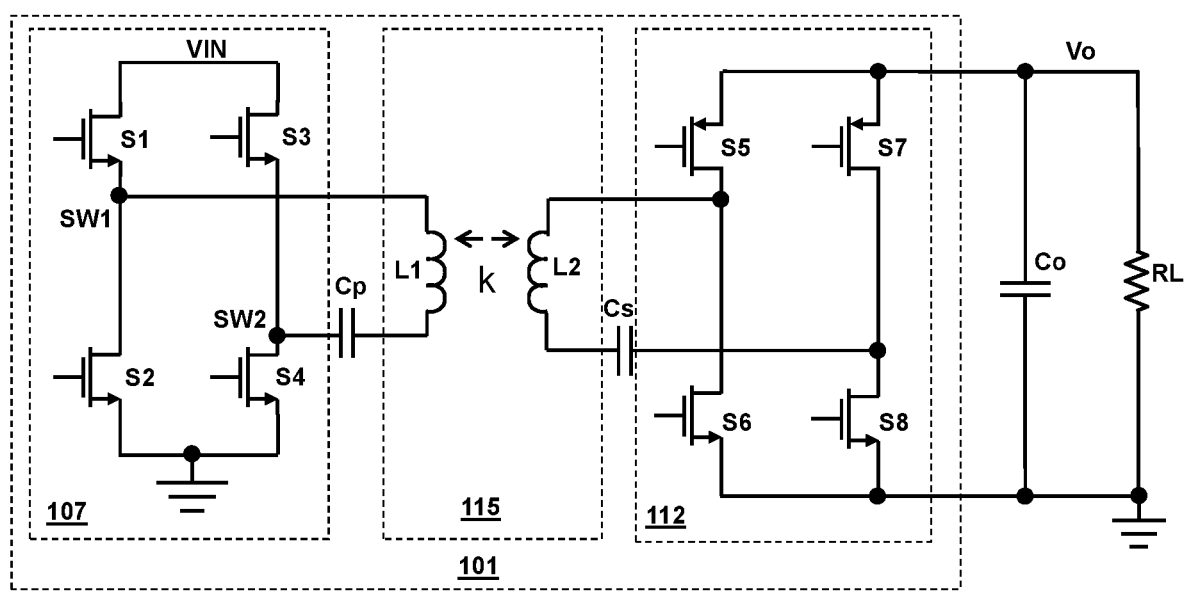
FIG. 2 illustrates a schematic diagram of the wireless power transfer system shown in FIG. 1 in accordance with various embodiments of the present disclosure.

FIG. 2 illustrates a schematic diagram of the wireless power transfer system shown in FIG. 1 in accordance with various embodiments of the present disclosure. The wireless power transfer device 101 comprises a transmitter circuit 107, a resonant capacitor Cp, a loosely coupled transformer 115, a resonant capacitor Cs and a rectifier 112 connected in cascade. The loosely coupled transformer 115 is formed by the transmitter coil L1 and the receiver coil L2. The transmitter circuit 107 is implemented as a full-bridge as shown in FIG. 2. Throughout the description, the full-bridge shown in FIG. 2 may be alternatively referred to as a power converter or a full-bridge power converter.

The full-bridge 107 includes four switching elements, namely S1, S2, S3 and S4. As shown in FIG. 2, the switching elements S1 and S2 are connected in series between an input voltage bus VIN and ground. The input voltage bus VIN is connected to the output of the power stage 104 shown in FIG. 1. Likewise, the switching elements S3 and S4 are connected in series between the input voltage bus VIN and ground. The common node (SW1) of the switching elements S1 and S2 is coupled to a first input terminal of the transmitter coil L1. The common node (SW2) of the switching elements S3 and S4 is coupled to a second input terminal of the transmitter coil L1 through the resonant capacitor Cp. The voltage between SW1 and SW2 is denoted as VSW. The waveform of VSW will be illustrated below with respect to FIG. 4.

According to some embodiments, the switching elements S1, S2, S3 and S4 are implemented as MOSFET or MOSFETs connected in parallel, any combinations thereof and/or the like. According to alternative embodiments, the switching elements (e.g., switch S1) may be an insulated gate bipolar transistor (IGBT) device. Alternatively, the primary switches can be any controllable switches such as integrated gate commutated thyristor (IGCT) devices, gate turn-off thyristor (GTO) devices, silicon controlled rectifier (SCR) devices, junction gate field-effect transistor (JFET) devices, MOS controlled thyristor (MCT) devices, gallium nitride (GaN) based power devices and/or the like.

It should be noted that while the example throughout the description is based upon a full-bridge converter (e.g., full-bridge 107 shown in FIG. 2), the implementation of the transmitter circuit 107 shown in FIG. 2 may have many variations, alternatives, and modifications. For example, half-bridge converters, push-pull converters, class E based power converters (e.g., a class E amplifier) may be alternatively employed. Furthermore, an inductor-inductor-capacitor (LLC) resonant converter may be formed when the transmitter coil L1 is tightly coupled with the receiver coil L2 in some applications.

In sum, the full-bridge 107 illustrated herein is limited solely for the purpose of clearly illustrating the inventive aspects of the various embodiments. The present invention is not limited to any particular power topology.

It should further be noted that while FIG. 2 illustrates four switches S1-S4, various embodiments of the present disclosure may include other variations, modifications and alternatives. For example, a separate capacitor may be connected in parallel with each switch of the full-bridge 107. Such a separate capacitor helps to better control the timing of the resonant process of the full-bridge 107.

The outputs of the receiver coil L2 are coupled to the load RL through the resonant capacitor Cs, the rectifier 112 and a capacitor Co. The rectifier converts an alternating polarity waveform received from the outputs of the receiver coil L2 to a single polarity waveform. The capacitor Co is employed to attenuate noise and provide a steady output voltage. The resonant capacitor Cs helps to achieve soft switching for the wireless power transfer system.

In some embodiments, the rectifier 112 is implemented as a synchronous rectifier. The rectifier 112 includes four switching elements, namely S5, S6, S7 and S8. As shown in FIG. 2, the switching elements S5 and S6 are connected in series between the output terminal of the rectifier 112 and ground. Likewise, the switching elements S7 and S8 are connected in series between the output terminal of the rectifier 112 and ground. As shown in FIG. 2, the common node of the switching elements S5 and S6 is coupled to a first terminal of the receiver coil L2. The common node of the switching elements S7 and S8 is coupled to a second terminal of the receiver coil L2 through the resonant capacitor Cs.

According to some embodiments, the switching elements S5, S6, S7 and S8 are implemented as MOSFET or MOSFETs connected in parallel, any combinations thereof and/or the like.

In operation, a plurality of transients may occur. The occurrence of the transients may have an impact on the wireless power transfer system 100 shown in FIGS. 1-2. In some embodiments, a coupling transient (juggle step condition) may occur. In the coupling transient, the magnetic coupling between the receiver and the transmitter changes from a loose coupling to a tight coupling. As a result of having this coupling transient, the output voltage of the receiver may rise significantly. Furthermore, the power transferred between the transmitter and the receiver increases too. In alternative embodiments, a load transient (load step condition) may occur. In the load transient, the load of the receiver goes from a heavy load state to a light load state. As a result of having this load transient, the output voltage of the receiver may rise significantly. The power transferred between the transmitter and the receiver falls during the load transient.

During the transients described above, the output voltage of the receiver increases significantly. In order to prevent the output of the receiver from being overstressed, a control loop is employed to adjust the output voltage of the receiver. In some embodiments, the control loop is implemented based on a feedforward control mechanism. The control loop will be described below with respect to FIG. 3.

Figure 3:
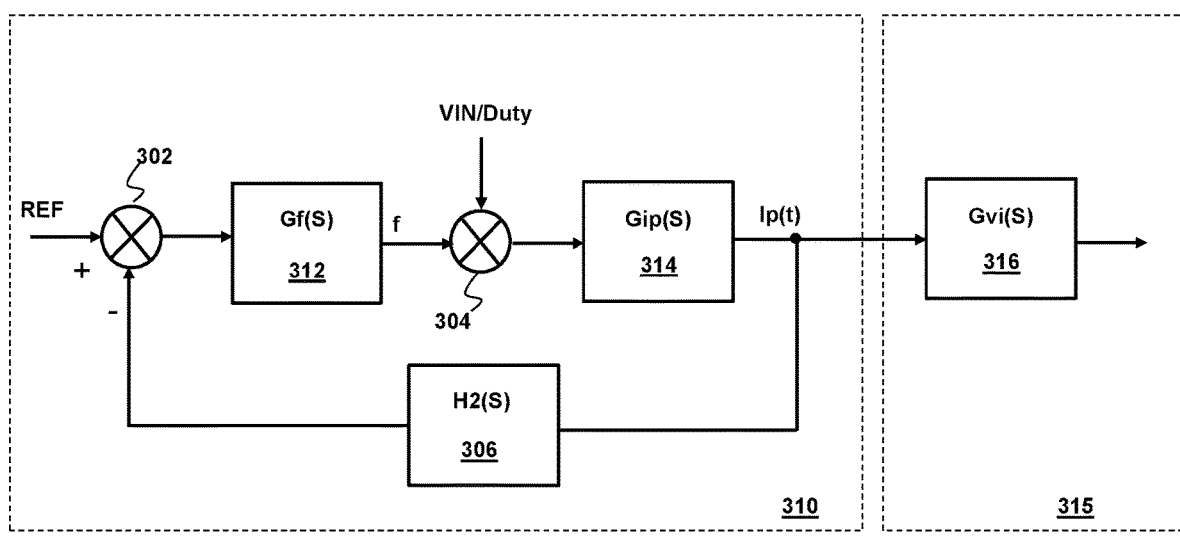
FIG. 3 illustrates a control loop for controlling the wireless power transfer system shown in FIG. 1 in accordance with various embodiments of the present disclosure.

FIG. 3 illustrates a control loop for controlling the wireless power transfer system shown in FIG. 1 in accordance with various embodiments of the present disclosure. The loop includes two portions, namely a primary side portion 310 and a secondary side portion 315. The primary side portion 310 comprises a first summer 302, a frequency adjustment block 312, a second summer 304, a primary side power conversion block 314 and a current gain block 306. The secondary side portion 315 comprises a secondary power conversion block 316.

As shown in FIG. 3, the feedback signal is a current signal Ip(t). In some embodiments, Ip(t) is the current flowing through the transmitter coil. As shown in FIG. 3, the feedback signal does not cross the isolation boundary. In other words, the feedback signal is not a feedback signal crossing from the secondary side to the primary side of the wireless power transfer system.

As shown in FIG. 3, the current signal Ip(t) is fed into the current gain block 306 where a predetermined current gain is applied to the current signal Ip(t). The output of the current gain block 306 and a predetermined current reference REF are fed into the first summer 302. The first summer 302 generates an error signal based on the difference between the predetermined current reference REF and the output of the current gain block 306. The error signal is fed into the frequency adjustment block 312. Based on the error signal, the frequency adjustment block 312 generates a switching frequency signal (f) for setting the current flowing through the transmitter coil. At the second summer 304, the switching frequency signal and other operating parameters such as VIN and the duty cycle of the power converter are combined together. The combined signal is applied to the primary side power conversion block 314 through which the current flowing through the transmitter coil is adjusted accordingly. Furthermore, the current flowing through the transmitter is applied to the secondary power conversion block 316 through a magnetic coupling. The secondary power conversion block 316 converts the current flowing through the transmitter into a regulated output voltage of the wireless power transfer system.

One advantageous feature of the control method shown in FIG. 3 is the control method enables a feedforward control mechanism without requiring a feedback control signal crossing the isolation between the primary side and the secondary side. This technique makes the fast transient response possible.

FIG. 3 illustrates the control loop for regulating the output voltage of the receiver. Based on the control loop shown in FIG. 3, different control mechanisms may be employed to regulate the output voltage of the receiver according to different transients. For example, the coupling transient occurs in a time range from about 10 milliseconds to about 100 milliseconds. The coupling transient is a slow transient. The load transient occurs in a time range from about 1 microsecond to about 10 microseconds. The load transient is a fast transient. In some embodiments, the load transient is much faster than the coupling transient. In consideration with the speed difference of these two transients, two different control mechanisms such as proportional integral derivative (PID) may be employed to adjust the output voltage of the receiver. A first PID control mechanism is designed for the coupling transient. A second PID control mechanism is designed for the load transient. In some embodiments, the second PID control mechanism provides a fast control loop. As a result of having this fast control loop, the transient response of the second PID control mechanism is faster than the transient response the first PID control mechanism.

In operation, the power transferred between the transmitter and the receiver during the coupling transient is different from that of the load transient. More particularly, during the coupling transient, the power transferred between the transmitter and the receiver rises significantly. On the other hand, during the load transient, the power transferred between the transmitter and the receiver falls sharply. This difference can be used to determine which type of transient occurs, and a corresponding control mechanism can be applied accordingly.

The power transferred between the transmitter and the receiver is proportional to the current flowing through the transmitter coil. In particular, the power transferred between the transmitter and the receiver is proportional to a particular current value (current value detected at one fourth of a switching cycle of the power converter). The relationship between the power transferred between the transmitter and the receiver and the current flowing through the transmitter coil will be described below with respect to FIG. 4.

Figure 4:
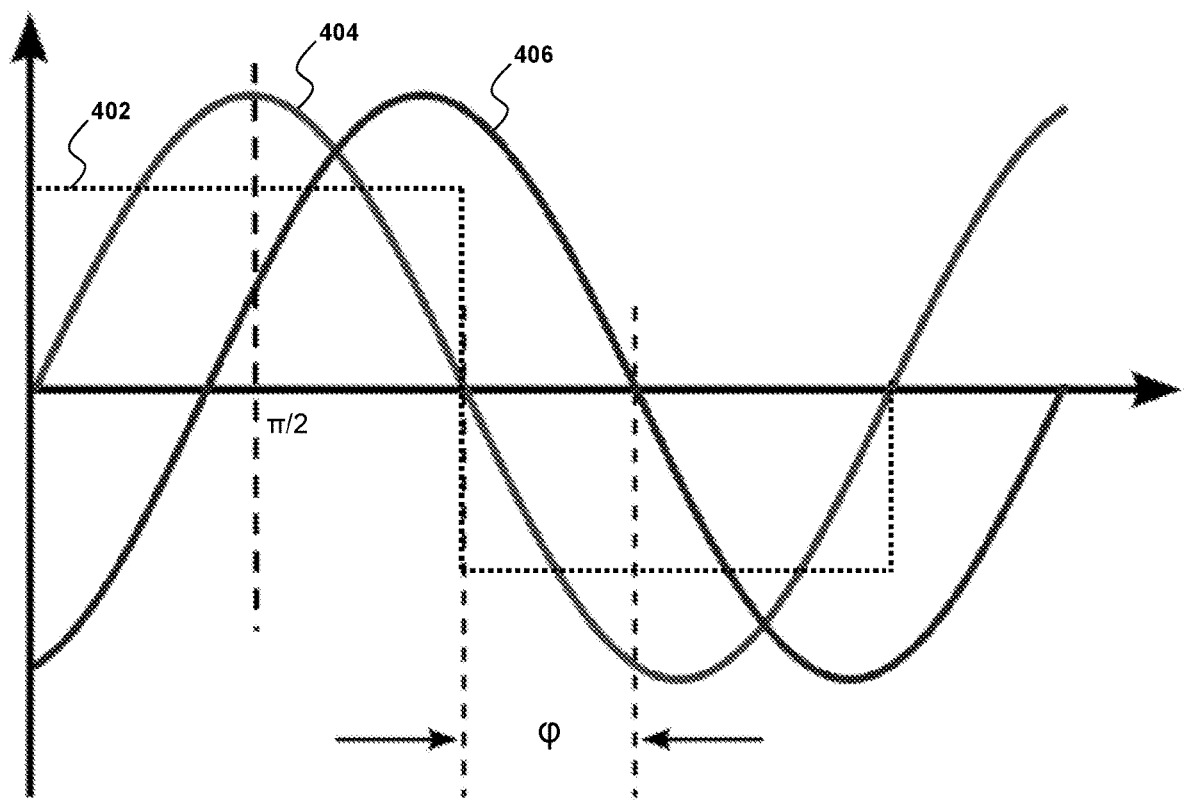
FIG. 4 illustrates various waveforms of the wireless power transfer system shown in FIG. 1 in accordance with various embodiments of the present disclosure.

FIG. 4 illustrates various waveforms of the wireless power transfer system shown in FIG. 1 in accordance with various embodiments of the present disclosure. The horizontal axis of FIG. 4 represents intervals of time. A first waveform 402 represents VSW (the voltage between two switching nodes SW1 and SW2 shown in FIG. 2). A second waveform 404 represents the fundamental frequency waveform of the first waveform 402. A third waveform 406 represents the current flowing through the transmitter coil.

As shown in FIG. 4, the current flowing through the transmitter coil lags the voltage (the fundamental frequency waveform of the first waveform 402). A phase difference between the voltage and the current is denoted as φ as shown in FIG. 4.

In operation, the power is transferred from the transmitter to the receiver. The voltage of the second waveform 404 can be expressed as:

$$V\text{in\_}sw(t) = \sqrt{2} \times U \times \sin(\omega t) \quad (1)$$

In Equation (1), U is the root-mean-square (rms) value of the voltage of the second waveform 404. U can be expressed by the following equation:

$$U = \frac{4 \times Vin}{\sqrt{2} \times \pi} \quad (2)$$

As shown in FIG. 4, the current flowing through the transmitter coil (waveform 406) lags the voltage (waveform 404). The current flowing through the transmitter coil can be expressed by the following equation:

$$I\text{coil}(t) = I_{pk} \times \sin(\omega t - \varphi) \quad (3)$$

In Equation (3), Ipk is the peak current value of the current flowing through the transmitter coil. The root-mean-square (rms) value of the current flowing through the transmitter coil can be expressed by the following equation:

$$I = I_{pk}/\sqrt{2} \quad (4)$$

The power transferred between the transmitter coil and the receiver coil can be obtained by computing the integral of the product of the voltage times the current over a period from 0 to $2\pi$. In one switching cycle, the power (or average power) transferred between the transmitter coil to the receiver coil can be expressed by the following equation:

$$P = \frac{1}{2\pi}\int_0^{2\pi} \text{Vin\_sw}(t) \times Icoil(t)d(t) \quad (5)$$

Equation (5) can be simplified as the following equation:

$$P = U \times I \times \cos(\varphi) \quad (6)$$

From Equation (4) above, the current satisfies the following equation:

$$I \times \cos(\varphi) = \frac{I_{pk} \times \sin\left(\frac{\pi}{2} - \varphi\right)}{\sqrt{2}} \quad (7)$$

In consideration with Equation (3), Equation (7) can be simplified as:

$$I \times \cos(\varphi) = \frac{1}{\sqrt{2}} \times Icoil\left(\frac{\pi}{2}\right) \quad (8)$$

In consideration with Equations (2) and (8), Equation (6) above can be expressed as:

$$P = \frac{2 \times Vin}{\pi} \times Icoil\left(\frac{\pi}{2}\right) \quad (9)$$

Equation (9) indicates that in a switching cycle, the power transferred between the transmitter and the receiver is proportional to the current flowing through the transmitter coil at a time instant corresponding to one fourth of a switching cycle.

In operation, in each switching cycle, a counter is employed to find the time instant corresponding to one fourth of the switching cycle. At this time instant, the current flowing through the transmitter coil is detected. Based on the detected current, the power transferred from the transmitter to the receiver can be calculated accordingly.

In operation, the detected current is compared with two predetermined thresholds. In some embodiments, a first predetermined threshold is a current threshold based on a power rise of about 10%. If the detected current is greater than the first predetermined threshold, a coupling transient occurs. The first PID control mechanism is activated to protect the output of the receiver from being overstressed. A second predetermined threshold is a current threshold based on a power fall of about 50%. If the detected current is less than the second predetermined threshold, a load transient occurs. The second PID control mechanism is activated to protect the output of the receiver from being overstressed. The detailed implementation of the first PID control mechanism and the second PID control mechanism will be described below with respect to FIGS. 5-7.

Figure 5:
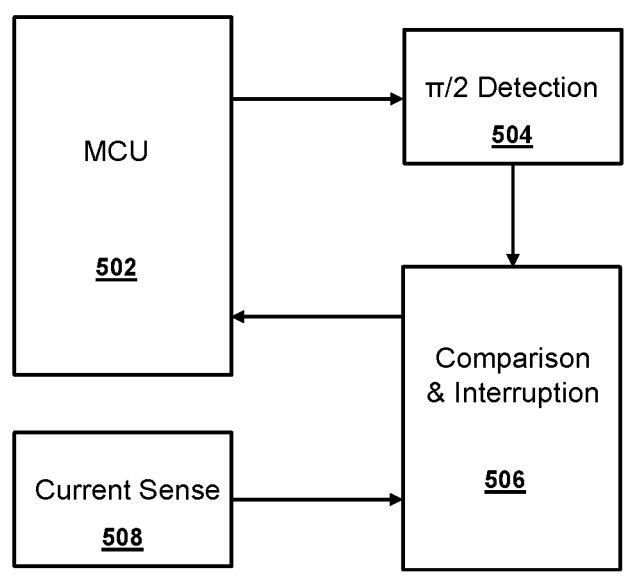
FIG. 5 illustrates a block diagram of a coupling and load transient protection apparatus in accordance with various embodiments of the present disclosure.

FIG. 5 illustrates a block diagram of a coupling and load transient protection apparatus in accordance with various embodiments of the present disclosure. The transient protection apparatus comprises a microcontroller unit (MCU) 502, a π/2 detection block 504, a comparison and interruption block 506 and a current sense block 508.

The MCU 502 sets up an integer equivalent to one fourth of a switching cycle of the power converter. The MCU 502 feeds this integer to the π/2 detection block 504. The current sense block 508 senses the input current of the wireless power transfer system. The sensed input current is fed into the comparison and interruption block 506 where a first predetermined current threshold and a second predetermined current threshold are determined based on the sensed input current.

In every switching cycle of the power converter, the π/2 detection block 504 starts counting from a rising edge of one PWM signal applied to the full-bridge. The π/2 detection block 504 keeps counting until the number reaches the integer set by the MCU 502. At the time instant equivalent to one fourth of the switching cycle, the current flowing through the transmitter coil (I_coil) is detected. The detected current (current flowing through the transmitter coil) is fed into the comparison and interruption block 506. The detected current is compared with the first predetermined current threshold and the second predetermined current threshold. If a transient occurs, the comparison and interruption block 506 generates a corresponding interrupt and feed this interrupt to the MCU 502. In response to the interrupt, the MCU 502 applies a corresponding control mechanism to the power converter.

Figure 6:
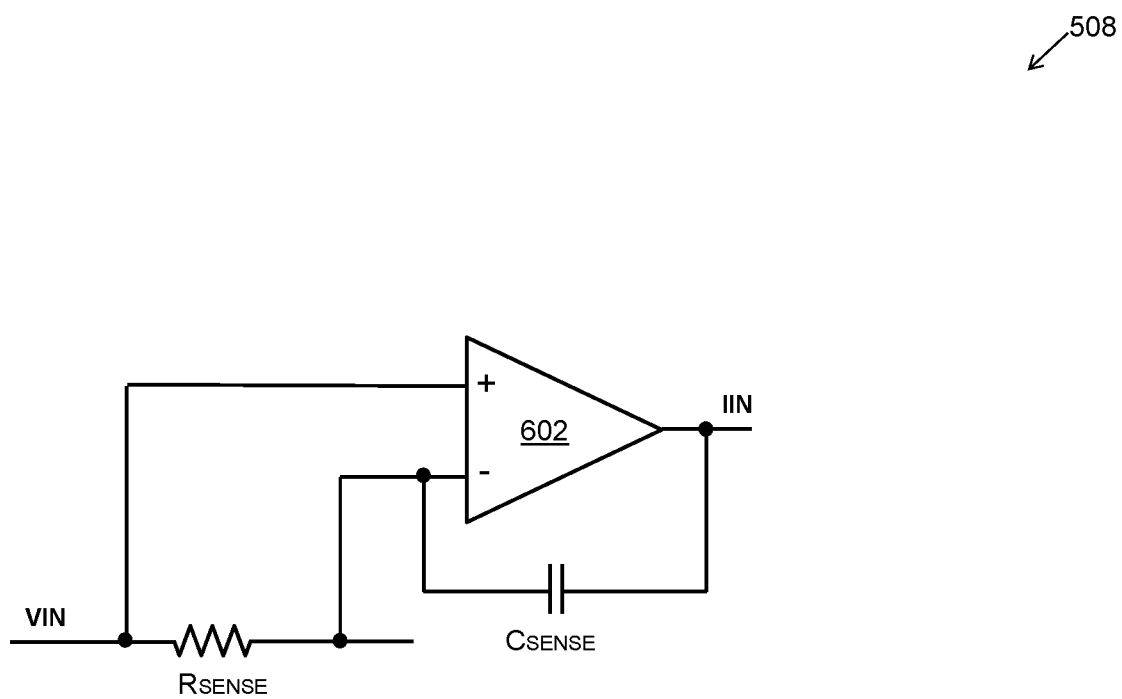
FIG. 6 illustrates a schematic diagram of the current sensing circuit for detecting the current flowing into the wireless power transfer system in accordance with various embodiments of the present disclosure.

FIG. 6 illustrates a schematic diagram of the current sensing circuit for detecting the current flowing into the wireless power transfer system in accordance with various embodiments of the present disclosure. The current sense block 508 comprises a current sense amplifier 602, a sense resistor $R_{SENSE}$ and a capacitor $C_{SENSE}$. The sense resistor $R_{SENSE}$ may be placed between VIN and the full-bridge power converter. The current flowing through the sense resistor $R_{SENSE}$ is the input current of the wireless power transfer system.

The inverting and non-inverting inputs of the current sense amplifier 602 are connected to the two terminals of the sense resistor $R_{SENSE}$ respectively. The capacitor $C_{SENSE}$ is connected between the output and the inverting input of the current sense amplifier 602. The output of the current sense amplifier 602 is configured to generate the sensed current IIN. The sensed current IIN is used to determine the first predetermined threshold and the second predetermined threshold described above. The operating principle of the current sense circuit shown in FIG. 6 is well known in the art, and hence is not discussed herein.

It should be noted that this diagram is merely an example, which should not unduly limit the scope of the claims. One of ordinary skill in the art would recognize many variations, alternatives, and modifications. For example, one skilled in the art would recognize that the current sense circuit shown in FIG. 6 is simply one manner of sensing the input current and that other and alternate embodiment current sensing circuits (e.g., a DC resistance (DCR) current sensing device) could be employed for this function.

Figure 7:
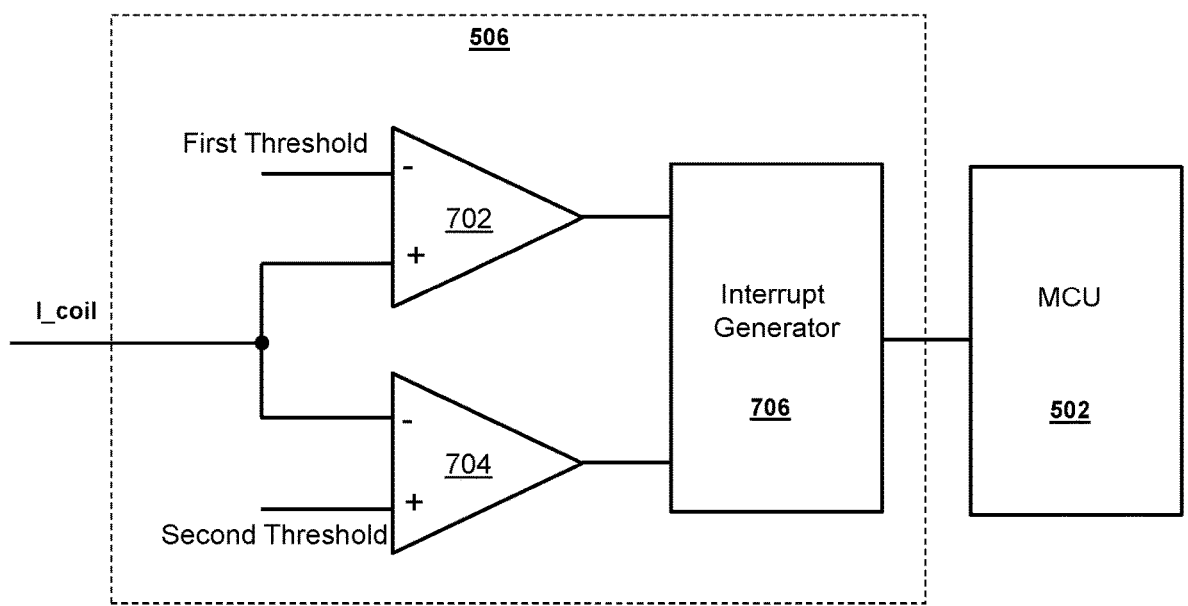
FIG. 7 illustrates a schematic diagram of the comparison and interruption block in accordance with various embodiments of the present disclosure.

FIG. 7 illustrates a schematic diagram of the comparison and interruption block in accordance with various embodiments of the present disclosure. The comparison and interruption block 506 comprises a first comparator 702, a second comparator 704 and an interrupt generator 706. As shown in FIG. 7, the sensed current (the current flowing through the transmitter coil) IIN is fed into the first comparator 702 and the second comparator 704 respectively. The inverting input of the first comparator 702 is coupled to a first predetermined threshold. The first predetermined threshold is a current threshold generated based on the input current flowing into the wireless power transfer system. The first predetermined threshold is used to determine whether a coupling transient occurs. The non-inverting input of the first comparator 702 is coupled to the current flowing through the transmitter coil (I_coil).

The inverting input of the second comparator 704 is coupled to the current flowing through the transmitter coil (I_coil). The non-inverting input of the second comparator 704 is coupled to a second predetermined threshold. The second predetermined threshold is a current threshold generated based on the input current flowing into the wireless power transfer system. The second predetermined threshold is used to determine whether a load transient occurs.

The output of the first comparator 702 and the output of the second comparator 704 are fed into the interrupt generator 706. Based on different transients, the interrupt generator 706 generates different interrupts and sends the interrupts to the MCU 502. The MCU 502 applies a corresponding control mechanism to the power converter. The operating principles of the interrupt generator and the MCU are well known in the art, and hence are not discussed herein to avoid unnecessary repetition.

It should be noted that the comparison and interruption block 506 discussed herein is provided for illustrative purposes only, and is provided only as an example of the functionality that may be included in the comparison and interruption block 506. One of ordinary of skill in the art would realize that the comparison and interruption block 506 may be implemented in many different ways, and it may include other function blocks.

Figure 8:
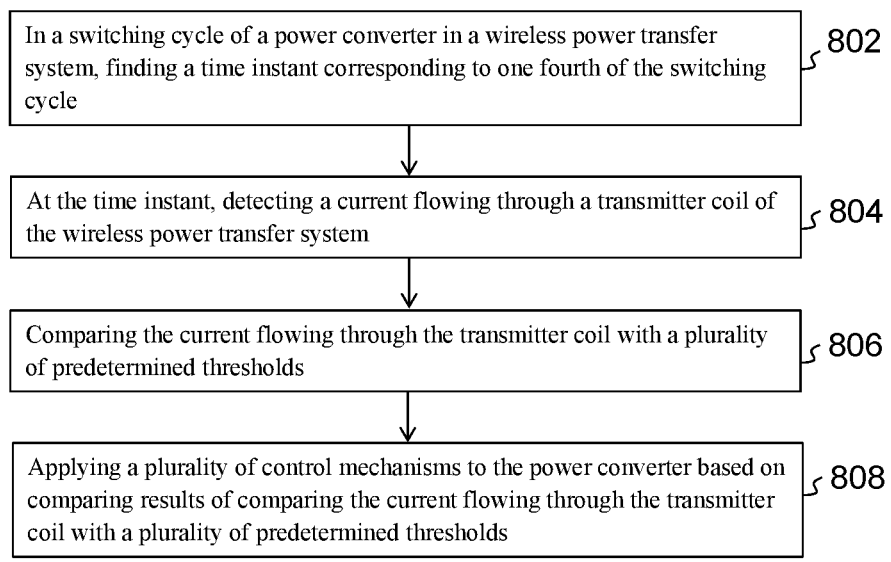
FIG. 8 illustrates a flow chart of a method for controlling the wireless power transfer system shown in FIG. 1 in accordance with various embodiments of the present disclosure.

FIG. 8 illustrates a flow chart of a method for controlling the wireless power transfer system shown in FIG. 1 in accordance with various embodiments of the present disclosure. This flowchart shown in FIG. 8 is merely an example, which should not unduly limit the scope of the claims. One of ordinary skill in the art would recognize many variations, alternatives, and modifications. For example, various steps illustrated in FIG. 8 may be added, removed, replaced, rearranged and repeated.

A wireless power transfer system comprises a transmitter and a receiver. The transmitter comprises a power converter and a transmitter coil. The receiver comprises a receiver coil and a rectifier. The transmitter coil is magnetically coupled to the receiver coil.

In operation, two different transients may be applied to the wireless power transfer system. When a coupling transient occurs, both the power transferred between the transmitter and the receiver, and the output voltage of the receiver rises. When a load transient occurs, the power transferred between the transmitter and the receiver falls, and the output voltage of the receiver rises.

A control apparatus is employed to detect the current flowing through the transmitter coil at a time instant corresponding to one fourth of a switching cycle of the power converter. The power transferred between the transmitter and the receiver is proportional to the value of the detected current. As such, the detected current is used to determine which type of transient occurs. In particular, when the detected current is greater than a first threshold, the coupling transient occurs. On the other hand, when the detected current is less than a second threshold, the load transient occurs. Based on the type of transient, an appropriate control mechanism is applied to the power converter so as to prevent the output of the receiver from being overstressed.

At step 802, in a switching cycle of the power converter of wireless power transfer system, a suitable circuit such as a counter is used to find a time instant corresponding to one fourth of the switching cycle.

At step 804, at the time instant corresponding to one fourth of the switching cycle, the current flowing through the transmitter coil of the wireless power transfer system is detected. The detected current is fed into a comparison and interrupt block.

At step 806, the detected current (the current flowing through the transmitter coil) is compared with a plurality of predetermined thresholds. In particular, the detected current is compared with a first predetermined threshold indicating whether a coupling transient occurs, and compared with a second predetermined threshold indicating whether a load transient occurs. When the detected current is greater than the first predetermined threshold, the coupling transient occurs. On the other hand, when the detected current is less than the second predetermined threshold, the load transient occurs.

At step 808, a control mechanism is applied to the power converter based on comparing results of the step of comparing the current flowing through the transmitter coil with a plurality of predetermined thresholds. In particular, a first PID control mechanism is applied to the power converter when the coupling transient occurs. A second PID control mechanism is applied to the power converter when the load transient occurs. In some embodiments, the transient response of the second PID control mechanism is faster than the transient response of the first PID control mechanism.

Although embodiments of the present disclosure and its advantages have been described in detail, it should be understood that various changes, substitutions and alterations can be made herein without departing from the spirit and scope of the disclosure as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. An apparatus comprising:
   a transmitter coil configured to be magnetically couple to a receiver coil;
   a power conversion device coupled to the transmitter coil; and
   a controller configured to control a operating variable of the power conversion device in response to a operating condition change, wherein the controller comprises a one-fourth cycle detection block configured to set up a current sensing time instant corresponding to one fourth of a switching cycle of the power conversion device, and wherein at the current sensing time instant, a current flowing through the transmitter coil is detected and compared with a plurality of predetermined thresholds to determine which type of transient occurs.

2. The apparatus of claim 1, wherein:
   the power conversion device is a full-bridge converter.

3. The apparatus of claim 1, wherein:
the controller is configured to adjust a switching frequency of the power conversion device in response to a transient.

4. The apparatus of claim 3, wherein:
the transient is a coupling transient, wherein under the coupling transient, the controller is configured to apply a first control mechanism to the power conversion device.

5. The apparatus of claim 4, wherein:
the transient is a load transient, wherein under the load transient, the controller is configured to apply a second control mechanism to the power conversion device.

6. The apparatus of claim 5, wherein:
a transient response of the second control mechanism is faster than a transient response the first control mechanism.

7. The apparatus of claim 1, further comprising:
a current sense block configured to sense an input current flowing into the power conversion device, wherein the sensed input current is used to generate a first threshold for determining whether a coupling transient occurs, and a second threshold for determining whether a load transient occurs.

8. The apparatus of claim 1, wherein:
at the current sensing time instant, power transferred from the transmitter coil to the receiver coil is proportional to the current flowing through the transmitter coil.

9. A method comprising:
in a switching cycle of a power converter in a wireless power transfer system, finding a time instant corresponding to one fourth of the switching cycle;
at the time instant, detecting a current flowing through a transmitter coil of the wireless power transfer system;
comparing the current flowing through the transmitter coil with a plurality of predetermined thresholds; and
applying a control mechanism to the power converter based on comparing results of the step of comparing the current flowing through the transmitter coil with a plurality of predetermined thresholds.

10. The method of claim 9, further comprising:
comparing the current flowing through the transmitter coil with a first predetermined threshold indicating a coupling transient; and
comparing the current flowing through the transmitter coil with a second predetermined threshold indicating a load transient.

11. The method of claim 10, further comprising:
applying a first control mechanism to the power converter when the coupling transient is applied to the wireless power transfer system; and
applying a second control mechanism to the power converter when the load transient is applied to the wireless power transfer system, wherein a transient response of the second control mechanism is faster than a transient response of the first control mechanism.

12. The method of claim 9, wherein:
at the time instant, power transferred from a transmitter to a receiver of the wireless power transfer system is proportional to the current flowing through the transmitter coil of the wireless power transfer system.

13. The method of claim 9, further comprising:
detecting an input current of the wireless power transfer system; and
determining the plurality of predetermined thresholds based on the input current.

14. The method of claim 9, further comprising:
in the switching cycle of the power converter, using a rising edge of a gate drive signal of the power converter as a starting point to start counting until finding the time instant corresponding to one fourth of the switching cycle.

15. A method comprising:
in a switching cycle of a power converter in a wireless power transfer system, finding a time instant corresponding to one fourth of the switching cycle, wherein the power converter is coupled between an input power source and a transmitter coil magnetically coupled to a receiver coil;
at the time instant, detecting a current flowing through the transmitter coil, wherein power transferred between the transmitter coil and the receiver coil is proportional to the current flowing through the transmitter coil;
comparing the current flowing through the transmitter coil with a plurality of predetermined thresholds to determine whether a transient occurs; and
applying a control mechanism to the power converter in response to an occurrence of the transient.

16. The method of claim 15, further comprising:
comparing the current flowing through the transmitter coil with a first predetermined threshold to determine whether a coupling transient occurs; and
applying a first control mechanism to the power converter in response to an occurrence of the coupling transient.

17. The method of claim 16, further comprising:
comparing the current flowing through the transmitter coil with a second predetermined threshold to determine whether a load transient occurs; and
applying a second control mechanism to the power converter in response to an occurrence of the load transient.

18. The method of claim 17, wherein:
a transient response of the second control mechanism is faster than a transient response of the first control mechanism.

19. The method of claim 17, further comprising:
sensing an input current of the wireless power transfer system; and
determining the first predetermined threshold and the second predetermined threshold based on the input current of the wireless power transfer system.

20. The method of claim 15, further comprising:
using a rising edge of a gate drive signal of the power converter as a starting point to start counting until finding the time instant corresponding to one fourth of the switching cycle.

* * * * *